United States Patent
Beisiegel et al.

(10) Patent No.: US 7,752,639 B2
(45) Date of Patent: Jul. 6, 2010

(54) APPARATUS, SYSTEM, AND METHOD FOR A PROGRAMMING MODEL FOR ACCESSING EIS SYSTEMS AS SERVICES

(75) Inventors: Michael Beisiegel, Poughkeepsie, NY (US); Jean-Sebastien Michel Delfino, San Carlos, CA (US); Martin Paul Nally, Laguna Beach, CA (US); Piotr Przybylski, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 11/466,045

(22) Filed: Aug. 21, 2006

(65) Prior Publication Data

US 2008/0126474 A1 May 29, 2008

(51) Int. Cl.
G06F 3/00 (2006.01)
G06F 9/44 (2006.01)
G06F 15/16 (2006.01)
(52) U.S. Cl. .................. 719/332; 717/102; 709/203
(58) Field of Classification Search ........................ None
See application file for complete search history.

(56) References Cited

U.S. PATENT DOCUMENTS

| 6,721,777 B1 | 4/2004 | Sharma | 709/101 |
| 2003/0074217 A1 | 4/2003 | Beisiegel et al. | 705/1 |
| 2003/0093470 A1 | 5/2003 | Upton | 709/203 |
| 2004/0177335 A1* | 9/2004 | Beisiegel et al. | 717/102 |
| 2006/0130038 A1* | 6/2006 | Claussen et al. | 717/168 |

OTHER PUBLICATIONS

IBM TDB/RD: *Technique to Synchronize an Emulator of Simulation Accelerator to Multiple, Asynchronous Target Systems* (Oct. 1996) p. 117-120.
ACM Digital Library: *A Multi Tier Framework for Accessing Distributed, Heterogeneous Spatial Data in a Federation Based EIS* Hofmann, C.; 1999.
ACM Digital Library: *The Gateway System: Uniform Web Based Access to Remote Resources* Fox, G. et al.; 1999.

* cited by examiner

*Primary Examiner*—Hyung S Sough
*Assistant Examiner*—Tuan Dao
(74) *Attorney, Agent, or Firm*—Kunzler Needham Massey & Thorpe

(57) ABSTRACT

An apparatus, system, and method are disclosed for accessing enterprise information system (EIS) resources in a service component architecture (SCA) for an integration server by selectively binding a service import to a low-level EIS resource adapter (RA) resource of an EIS service provider in response to a declarative binding definition, selectively binding a service import to an EIS service of the EIS service provider in response to a declarative binding definition, and selectively binding a service import to one or more EIS resources through an EIS service mapping configured to transform a service request from the service component client to satisfy an interface pattern of the EIS service provider. By allowing access to resources at different levels and allowing mappings of resources, the requirements of service clients can be met.

3 Claims, 4 Drawing Sheets

APPARATUS, SYSTEM, AND METHOD FOR A PROGRAMMING MODEL FOR ACCESSING EIS SYSTEMS AS SERVICES

BACKGROUND OF THE INVENTION

1. Field of the Invention

This invention relates to accessing resources from enterprise information systems (EIS) and more particularly relates to a programming model for accessing EIS resource adapters on various levels.

2. Description of the Related Art

An IBM WebSphere Process Server implements the Java 2 Enterprise Edition (J2EE) Connector architecture (JCA), version 1.5. JCA is a standard architecture for integrating J2EE applications with enterprise information systems. Also known as resource adapters or JCA adapters, WebSphere Adapters enable managed, bidirectional connectivity between enterprise information systems (EISs) and J2EE components supported by WebSphere Process Server.

The Resource Adapters that follow the J2EE Connector Architecture specification provide their functionality through the set of common client interfaces (CCIs), as defined in the J2EE specification. This is not sufficient for use in the service oriented architecture (SOA), as their functionality needs to be exposed as services, at different levels, based on the requirements of a client. A programming model is needed to allow the use of EIS resources by service component architecture (SCA) components.

From the foregoing discussion, it should be apparent that a need exists for an apparatus, system, and method that enable the use of EIS resources by the SCA components as required by a client. Beneficially, such an apparatus, system, and method would enable access to EIS resources at various levels, and map resources to meet the needs of a client.

SUMMARY OF THE INVENTION

The present invention has been developed in response to the present state of the art, and in particular, in response to the problems and needs in the art that have not yet been fully solved by currently available programming models for accessing EIS systems as services. Accordingly, the present invention has been developed to provide an apparatus, system, and method for a programming model for accessing EIS systems as services that overcome many or all of the above-discussed shortcomings in the art.

The apparatus for a programming model for accessing EIS systems as services is provided with a plurality of modules configured to functionally execute the necessary steps to enable access to EIS resources at various levels, and map resources to meet the needs of a client.

The apparatus, in one embodiment, is a computer program product comprising a computer readable medium having computer usable program code programmed for accessing enterprise information system (EIS) resources in a service component architecture (SCA) for an integration server, the computer program product when executed on a computer causes the computer to enable communication between an EIS service provider configured to supply at least one loosely coupled and platform-independent resource and a service component client configured to access the at least one loosely coupled and platform-independent resource provided by the EIS service provider.

The computer further implements the service communication architecture and selectively binds a service import to a low-level EIS resource adapter (RA) resource of the EIS service provider in response to a declarative binding definition. The computer further selectively binds a service import to an EIS service of the EIS service provider in response to a declarative binding definition. The computer further selectively binds a service import to one or more EIS resources through an EIS service mapping configured to transform a service request from the service component client to satisfy an interface pattern of the EIS service provider.

In one embodiment of the computer program product, the computer further selectively binds a service export to a service component client as a low-level EIS resource adapter (RA) resource in response to a declarative binding definition. In a further embodiment, the computer selectively binds a service export to a service component client as an EIS service in response to a declarative binding definition. The computer further selectively binds a service export to a service component client as an EIS service mapping configured to transform one or more services from the EIS service provider to satisfy an interface pattern on the service component client.

In a further embodiment, the computer program product may be configured to include a declarative binding definition that comprises non-compiled, human readable code processed by an interpreter. The computer program product uses declarative definitions to define imports, exports, and bindings such that service component clients and EIS resource adapters can interact in a service component architecture with robust flexibility and adaptability consistent with the services oriented programming model.

A system of the present invention is also presented to access EIS resources in a service component architecture (SCA) for an integration server. The system may be embodied by an EIS service provider, a service component client, a service interface bus (SIBus), a websphere process server, and a service binder.

In particular, the system, in one embodiment, includes an EIS service provider configured to supply at least one loosely coupled and platform-independent resource, a service component client configured to access the at least one loosely coupled and platform-independent resource provided by the EIS service provider. The system also includes a service interface bus (SIBus) architecture configured to enable communication between the EIS service provider and the service component client, a websphere process server configured to implement the SIBus architecture, a service binder configured to selectively bind a service import to a low-level EIS resource adapter (RA) resource of the EIS service provider in response to a declarative binding definition, selectively bind a service import to an EIS service of the EIS service provider in response to a declarative binding definition, and selectively bind a service import to one or more EIS resources through an EIS service mapping configured to transform a service request from the service component client to satisfy an interface pattern of the EIS service provider.

The system may further include EIS service mappings that comprise more than one EIS services.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code maybe a single instruction, or many instructions, and may even be distributed over several different code segments, among different programs, and across several memory devices. Similarly, operational data maybe identified and illustrated herein within modules, and may be embodied in any suitable form and organized within any suitable type of data structure. The operational data may be collected as a single data set, or maybe distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
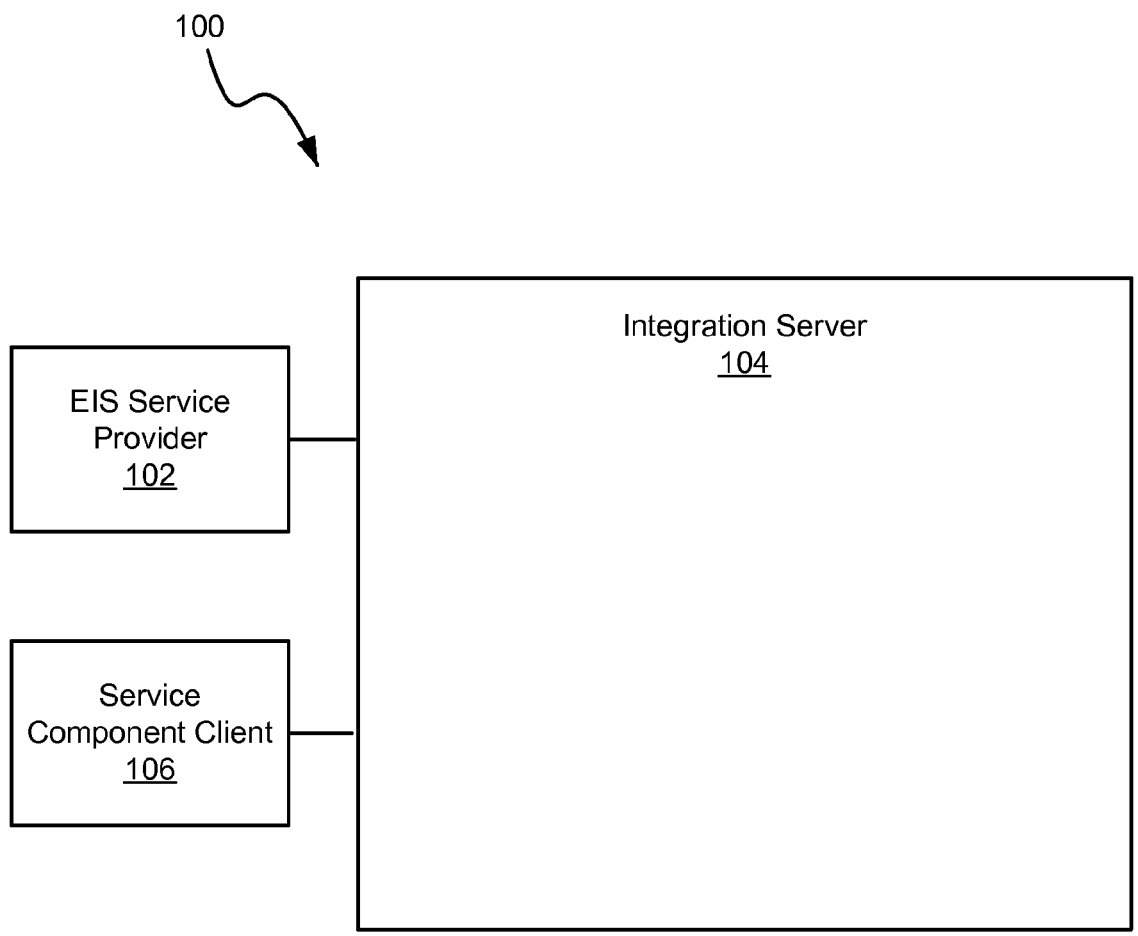
FIG. 1 is a schematic block diagram illustrating one embodiment of a system for accessing enterprise information systems (EIS) resources in accordance with the present invention.

FIG. 1 illustrates one embodiment of a system 100 for accessing and manipulating enterprise information systems (EIS) resources. Included in the system 100 are an EIS service provider 102, an integration server 104, and a service component client 106. The system 100 for accessing and manipulating EIS resources enables the sharing of services between an EIS service provider 102 and a service component client 106.

The EIS service provider 102, in one embodiment, supplies a business function for use by other elements of the system. A business function is a loosely coupled, platform-independent resource wherein the implementation of the resource is separated from the resource itself, resulting in reusable, replaceable resources. Examples of an EIS service provider 102 include SAP™, BPEL™, Oracle™, Customer Information Control System (CICS), and the like.

The integration server 104, in one embodiment, automates business processes by integrating business functions that span workflows, applications, systems, platforms, and/or architectures. In one embodiment, the integration server 104 binds an export from an EIS service provider 102 to an import of a service component client 106. Examples of different integration servers 104 (also known as application or process servers) include IBM WebSphere Process Server™, BEA Weblogic Server, Jboss, Oracle Application Server, and the like.

The service component client 106, in one embodiment, receives a business resource supplied by an EIS service provider 102. The business resource received by the service component client 106 conforms to a definition as required by the service component client 106, resulting in a loose coupling between the service component client 106 and the EIS service provider 102. The business resource comprises a set of logic or functionality that provides a desired result to the service component client 106 given a set of input data. The definition of the business resource may require that the business resource be accessed at a particular level within the SCA architecture, such as the resource level or the service level. An example of a resource level business resource is a JCA adapter. An example of a service level business resource is a Service Data Object (SDO). Another example of a service level resource is one or more SDOs that have been remapped to create an SDO that matches the definition of a business resource called for in a service request by a service component client 106.

Since the EIS service provider 102 may supply the business resource as a resource level resource or a service level resource, and the service component client 106 may require that a business resource be provided as a resource level resource or a service level resource, in one embodiment the integration server 104 is capable of binding imports and exports at either of the resource level and the service level. Selection of the proper binding may be determined by a declarative binding definition, explained below. Furthermore, when the service component client 106 requires that a resource be provided in a different pattern than the resource delivered by the EIS service provider 102, the integration server 104, in one embodiment, is capable of remapping the provided resource to match the pattern required by the service component client 106. Examples of an integration server 102 that bind imports and exports at various levels and mappings are described below in relation to FIGS. 2 through 4.

Figure 2:
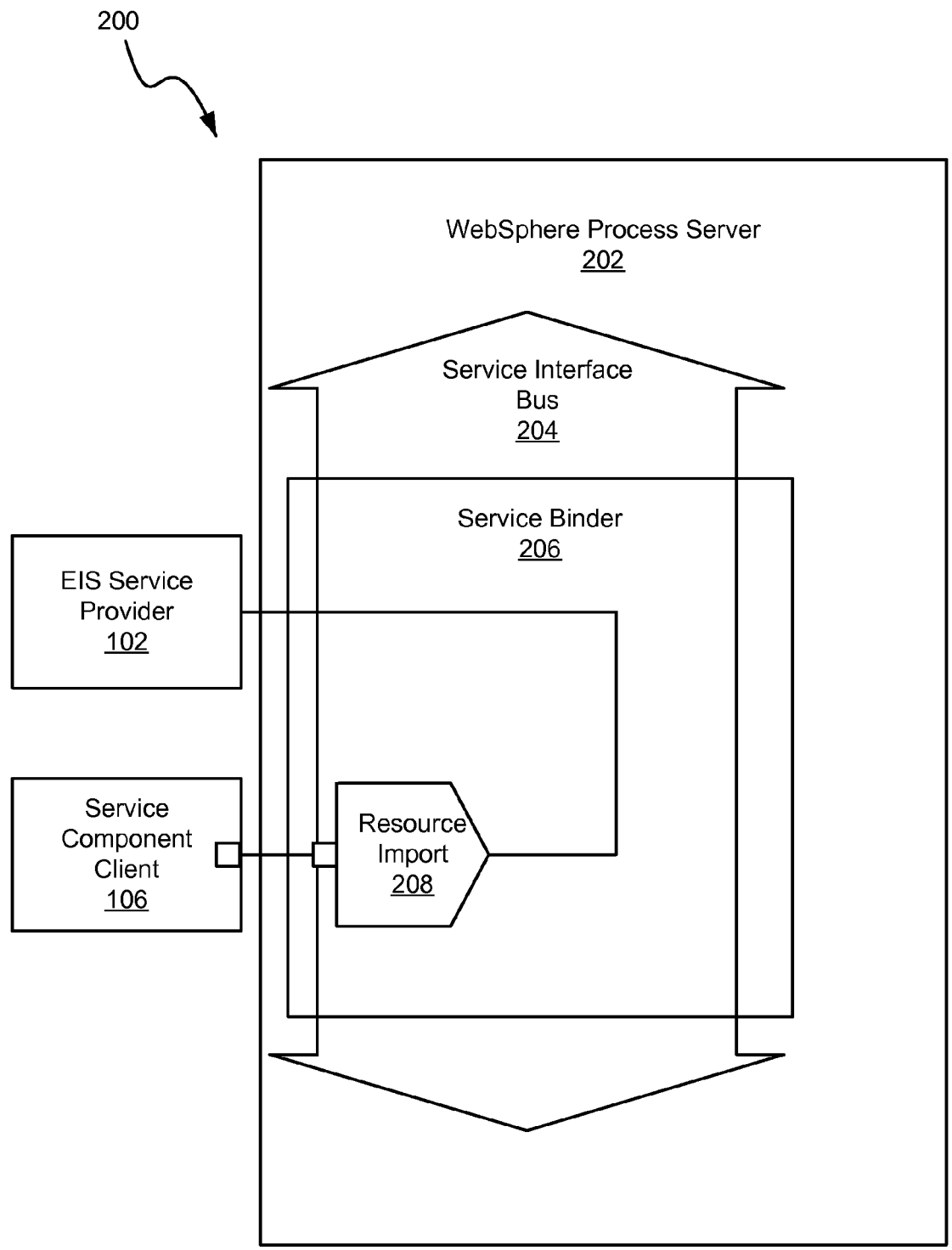
FIG. 2 is a schematic block diagram illustrating one embodiment of an apparatus for accessing an EIS resource at the adapter level.

FIG. 2 illustrates one embodiment of an apparatus 200 for accessing an EIS resource at the adapter level. The apparatus 200 includes, in one embodiment, a WebSphere Process Server 202, a service bus, such as a Service Interface Bus (SIBus) 204, and a service binder 206. The apparatus 200 for accessing EIS resources at the adapter level enables the sharing of resource level business resources between an EIS service provider 102 and a service component client 106. The EIS service provider 102 and the service component client 106 are preferably configured in a manner similar to like numbered components in relation to FIG. 1.

The WebSphere Process Server 202, in one embodiment, automates business processes by integrating business functions that span workflows, applications, systems, platforms, and/or architectures. In one embodiment, the WebSphere Process Server 202 connects a business resource from an EIS service provider 102 to a service component client 106.

The SIBus 204, in one embodiment, enables communication between an EIS service provider 102 and a service component client 106 and provides a medium for exposing and accessing business resources. The SIBus 204 may include one or more resource imports 206 and one or more resource exports (not shown). An EIS service provider 102 may access the SIBus 204 to expose a low-level resource adapter (RA) resource to a service component client 106. A service component client 106 may access the SIBus 204 to access business resources provided by an EIS service provider 102.

As will be appreciated by one skilled in the art, a variety of types and configurations of service interface bus 204 may be implemented without departing from the scope and spirit of the invention. For example, in one embodiment, the service interface bus 204 may be a service bus referring to an SCA runtime. In another embodiment, the service interface bus 204 may be a SIBus in a WebSphere Process Server.

In one embodiment, the service binder 206 binds a business resource between an EIS service provider 102 and a service component client 106. The service binder 206, in one embodiment, binds a resource export, such as a JCA adapter, from an EIS service provider 102 to a resource import 208 of a service component client 106. The service binder 206, in one embodiment, binds business resources in response to a declarative binding definition. The declarative binding definition consists of human readable code processed by an interpreter and written in a markup language, such as service component definition language (SCDL) derived from XML. In one embodiment, the declarative binding definition is located in the resource import 208.

As will be appreciated by one skilled in the art, a variety of configurations of apparatuses 200 for accessing EIS resources on the adapter level may be utilized without departing from the scope and spirit of the present invention. For example, in one embodiment, the SIBus 204 may include a resource export (not shown) from a service component client 106 bound by the service binder 206 to a resource import of an EIS service provider 102. In another embodiment, the WebSphere Process Server 202 may be an integration server 104.

Figure 3:
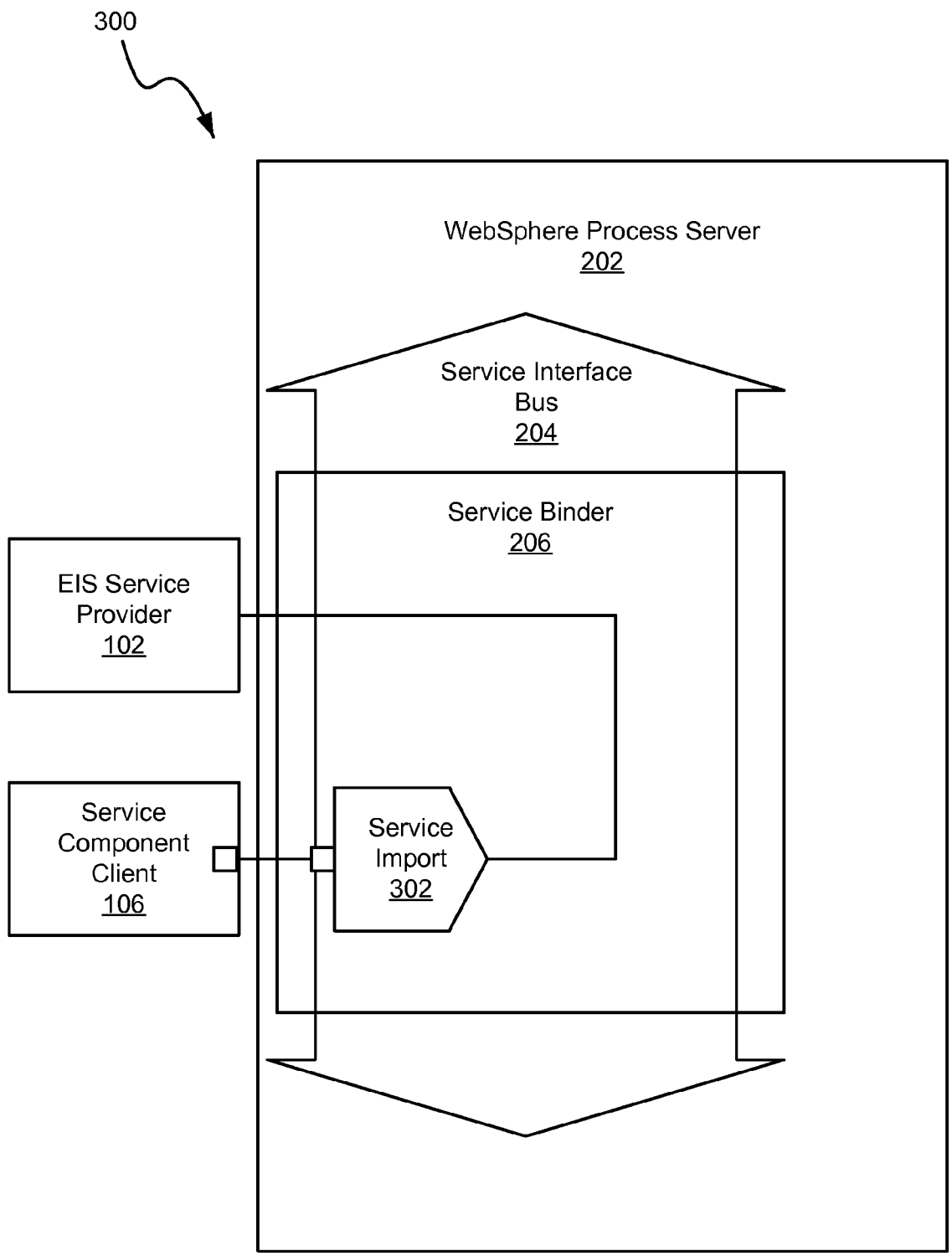
FIG. 3 is a schematic block diagram illustrating one embodiment of an apparatus for accessing an EIS resource at the service level.

FIG. 3 illustrates one embodiment of an apparatus 300 for accessing an EIS resource at the service level. The apparatus 300 includes, in one embodiment, a WebSphere Process Server 202, a Service Interface Bus (SIBus) 204, and a service binder 206. The apparatus 300 for accessing EIS resources at the service level enables the sharing of service level business resources between an EIS service provider 102 and a service component client 106. The EIS service provider 102 and the service component client 106 are preferably configured in a manner similar to like numbered components in relation to FIG. 1. The WebSphere Process Server 202 is preferably configured in a manner similar to a like numbered component in relation to FIG. 2.

The SIBus 204, in one embodiment, enables communication between an EIS service provider 102 and a service component client 106 and provides a medium for exposing and accessing business resources. The SIBus 204 may include one or more service imports 302 and one or more service exports (not shown). An EIS service provider 102 may access the SIBus 204 to expose a service to a service component client 106. A service component client 106 may access the SIBus 204 to access a service provided by an EIS service provider 102.

In one embodiment, the service binder 206 binds a business resource between an EIS service provider 102 and a service component client 106. The service binder 206, in one embodiment, binds a service export, such as an SDO, from an EIS service provider 102 to a resource import 208 of a service component client 106. The service binder 206, in one embodiment, binds business resources in response to a declarative binding definition. The declarative binding definition consists of human readable code written in a functional programming language, such as service component definition language (SCDL). In one embodiment, the declarative binding definition is located in the service import 302.

As will be appreciated by one skilled in the art, a variety of configurations of apparatuses 300 for accessing EIS resources on the service level may be utilized without departing from the scope and spirit of the present invention. For example, in one embodiment, the SIBus 204 may include a service export (not shown) from a service component client 106 bound by the service binder 206 to a service import of an EIS service provider 102. In another embodiment, the WebSphere Process Server 202 may be an integration server 104.

Figure 4:
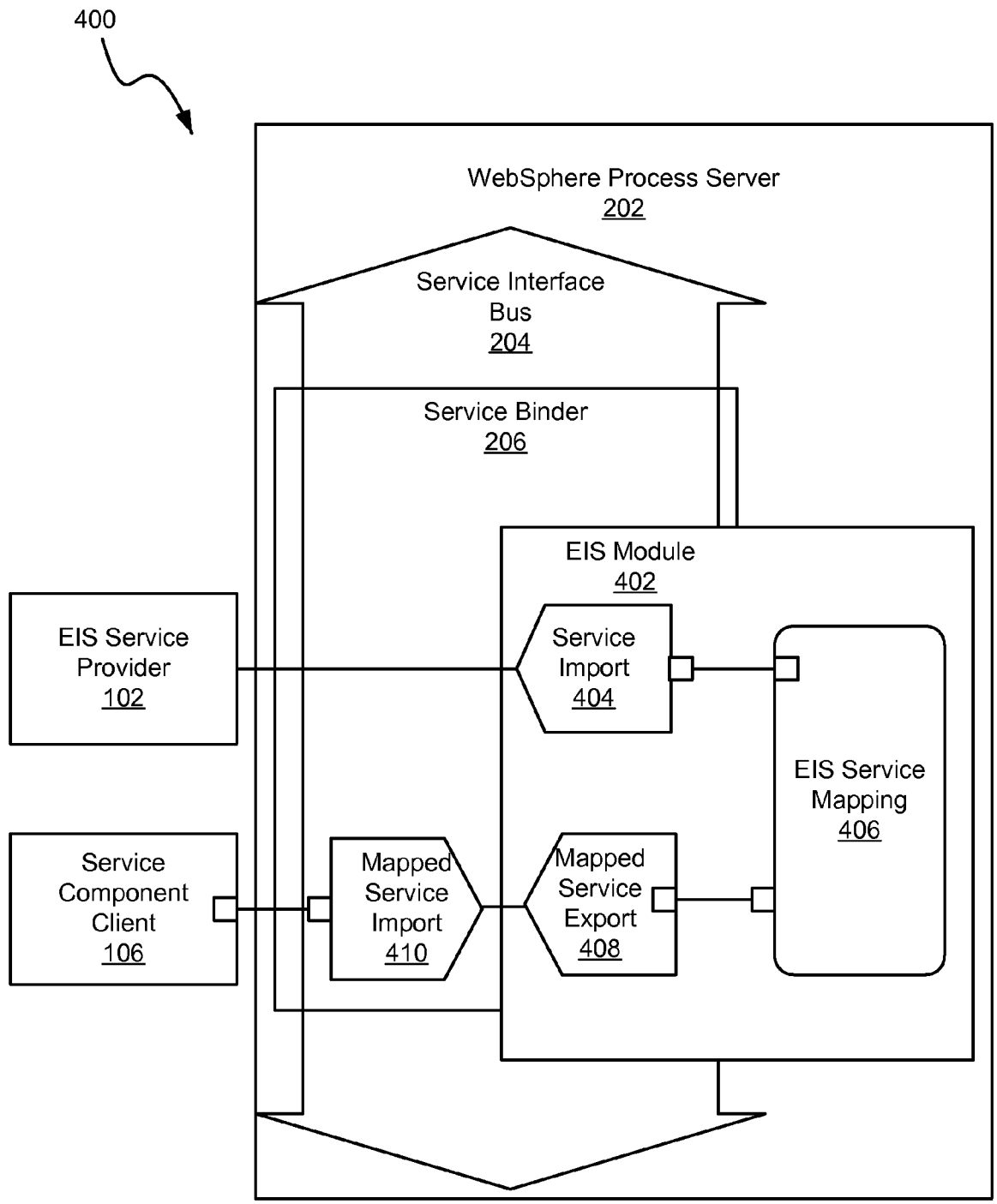
FIG. 4 is a schematic block diagram illustrating one embodiment of an apparatus for accessing an EIS resource as a mapped service at the service level.

FIG. 4 illustrates one embodiment of an apparatus 400 for accessing an EIS resource as a mapped service at the service level. The apparatus 400 includes, in one embodiment, a WebSphere Process Server 202, a Service Interface Bus (SIBus) 204, a service binder 206, and an EIS module 402. The way an EIS service provider 102 exposes its services may often not fit the definition required by a service component client 106. Examples of what may not fit include: the definition may require a different schema to represent the data, the definition may require one method call including multiple call to the actual EIS service, and so on. The apparatus 400 for accessing EIS resources at the service level enables the sharing of a mapped service as a service level business resource between an EIS service provider 102 and a service component client 106 that maps one or more services to match the definition provided by the service component client 106 in a service request.

The EIS service provider 102 and the service component client 106 are preferably configured in a manner similar to like numbered components in relation to FIG. 1. The WebSphere Process Server 202 is preferably configured in a manner similar to a like numbered component in relation to FIG. 2.

The SIBus 204, in one embodiment, enables communication between an EIS service provider 102 and a service component client 106 and provides a medium for exposing and accessing business resources. The SIBus 204 may include one or more mapped service imports 410 and one or more mapped service exports (not shown). An EIS service provider 102 may access the SIBus 204 to expose a service to a service component client 106 and an EIS module 402. A service component client 106 may access the SIBus 204 to access a service provided by an EIS service provider 102 and an EIS module 402. An EIS module 402 may access the SIBus 204 to retrieve one or more services and expose a mapping of the one or more services.

In one embodiment, the service binder 206 binds a business resource between an EIS service provider 102 and a service component client 106. The service binder 206, in one embodiment, binds a service export, such as an SDO, from an EIS service provider 102 to a resource import 208 of a service component client 106. The service binder 206, in one embodiment, binds business resources in response to a declarative binding definition. The declarative binding definition, in one embodiment, comprises human readable code processed by an interpreter and written in a markup language, such as service component definition language (SCDL) derived from XML. In one embodiment, the declarative binding definition is located in the mapped service import 410.

The EIS module 402, in one embodiment, exposes a service on the SIBus 204 that is a mapping of one or more services that follows a specific pattern as required by a service component client 106. The EIS module 402 includes one or more service imports 404, an EIS service mapping 406, and one or more mapped service exports. The EIS module 402 generates a service to match the pattern requirements of a service component client 106 mapped service import 410 and exposes the mapped service export 408 on the SIBus 204.

The EIS service mapping 406, in one embodiment, is an implementation that maps a service provided by an EIS service provider 102 to meet the requirements of a service component client 106. For example, the EIS service mapping 406 may be a Java implementation that locates a service, reorders data provided by the service, and generates a new service using the reordered data. The new service generated by the EIS service mapping 406 can then be made available on the SIbus 204 through a mapped service export 408.

As will be appreciated by one skilled in the art, a variety of configurations of apparatuses 400 for accessing mapped EIS resources on the service level may be utilized without departing from the scope and spirit of the present invention. For example, in one embodiment, the SIBus 204 may include a service export (not shown) from a service component client 106 bound by the service binder 206 to a mapped service import (not shown) of an EIS service provider 102. In another embodiment, the WebSphere Process Server 202 may be an integration server 104.

Additional representative embodiments of an apparatus, system, and method for accessing and manipulating EIS resources at various levels are described in the following examples.

An EIS Import, in one embodiment, comes in two variants: the EIS RA (Resource Adapter) Import 208, and the EIS Service Import 302. The EIS RA Import 208 allows a user to access an EIS resource using the low level resource adapter interface. An EIS RA Import 208, in one embodiment, can be referenced and wired like any other SCA or SCA Import. A user may use the SCA client programming model to interact with the EIS RA Import 208.

An interface of an EIS RA Import 208, in one embodiment, is the standard javax.resource.cci.Interaction interface provided by the J2EE Connector Architecture.

An EISImportBinding, in one embodiment, requires a user to specify the connection type and the connection properties for configuring the respective connection type. The EISImportBinding is defined in the declarative binding definition. The connection type may be specified thru an implementation class of the javax.resource.spi.Managed ConnectionFactory interface as defined by the J2EE Connector Architecture.

The following shows an example of an EIS RA Import 208 definition for accessing a CICS resource.

```
<scdl:import name="resources/cics/MyCICS_A" ...>
    <interfaces>
        <interface xsi:type="java:JavaInterface"
interface="javax.resource.cci.Interaction" />
    </interfaces>
    <binding xsi:type="eis:EISImportBinding">
        <connection
type="com.ibm.j2c.cics.ECIManagedConnectionFactory>
            <serverName>MyCICS_A</serverName>
        </connection>
    </binding>
</scdl:import>
```

In the next set of example code, client code in the service component client 106 using the defined EIS RA Import 208 is shown.

```
. . .
CustomerRecord customerIn=new CustomerRecord( );
customerIn.setCustNo("12345");
CustomerRecord customerOut=new CustomerRecord( );
ECIInteractionSpec interactionSpec=new ECIInteractionSpec( );
interactionSpec.setFunctionName("TADERC99");
Interaction myCICSA_A (Interaction)serviceManager.locateService("myCICS_A");
myCICS_A.execute(interactionSpec, customerIn, customerOut);
. . . =customerOut.getFirstName( );
. . . =customerOut.getLastName( );
```

Interactionspec defines the functions of the EIS that is to be executed, "myCICS_A" in the example. Advantageously, defining the EISImportBinding in the declarative binding definition facilitates a connection between a service component client 106 and an EIS service at the resource adapter level.

An EIS Service Import 302, in one embodiment, allows access to an exiting EIS Service at the EIS service level. An interface of the EIS Service Import 302 may be a Java or WSDL portType translation of the interface of the existing EIS service. The EISImportBinding may require a user to specify the connection type and the connection properties for configuring the respective connection type. A connection type may be specified through an implementation class of the javax.resource.spi.ManagedConnectionFactory interface as defined by the J2EE Connector Architecture.

In one embodiment, the EISImportBinding may require the specification of an interactionType as well as methodBindings. The interactionType may be specified through an implementation class of the javax.resource.cci.-InteractioSpec interface as defined by the J2EE Connector Architecture.

For each method in the interface of the EIS Service Import 302, in one embodiment, a user may specify a methodBinding. The methodBinding holds the metadata information on how the EIS service requests have to be formatted so that they are understood by the EIS. The metadata information consists of two parts, the interaction properties for configuring the respective interaction type and the data bindings for input and output. The interaction properties represent the mapping of the method name to the functionName as known by the EIS. The data bindings for input and output describe how the data has to be formatted to be understood by the EIS.

The following shows an example of an EIS Service Import 302 definition in the declarative binding definition for accessing an existing CICS service provided by an EIS service provider 102.

```
<scdl:import name="mycics/services/CustomerInfo"
    ...
    xmlns:mycics="http://services.mycics/"
    xsi:schemaLocation="http://services.mycics/
Customer.xsd">
    <interfaces>
        <interface  xsi:type="java:JavaInterface"
        interface="mycics.services.CustomerInfo" />
    </interfaces>
    <binding xsi:type="eis:EISImportBinding">
        <connection
type="com.ibm.j2c.cics.ECIManagedConnectionFactory
interactionType="com.ibm.j2c.cics.ECIInteractionSpec" >
            <serverName>MyCICS_A</serverName>
            ...
        </connection>
        <methodBinding method="getCustomerInfo">
            <interaction>
                <functionName>TADERC99</functionName>
            </interaction>
            <inDataBinding xsd="mycics:tCustomer" />
            <outDataBinding xsd="mycics:tCustomer" />
        </methodBinding>
        ...
    </binding>
</scdl:import>
```

The following shows an example of client code in the service component client 106 using the former EIS Service Import is shown.

```
...
Customer customer=new Customer( );
customer.setCustNo("12345");
CustomerInfo customerInfo=(CustomerInfo)serviceManager.locateService("customerInfo");
customer=customerInfo.getCustomer(customer);
... =customer.getFirstName( );
... =customer.getLastName( );
...
```

Advantageously, defining the EIS Service Import 302 in the declarative binding definition provides greater flexibility for the programmer of the service component client 106 and the EIS service provider 102. Neither component is restricted to using one level of connection (resource level or service). Because the declarative binding definition is a dynamic declarative definition, the software of the service component client 106 or the EIS service provider 102 can remain unchanged if the service component client 106 or the EIS service provider 102 is changed to use a different level. A simple change to the declarative binding definition may be the only change required.

The way an EIS service provider 102 exposes its services may often not fit the view required by the service component client 106. Samples of what may not fit are: the service component client 106 may require a different schema to represent the data, may require one method call that requires multiple separate calls on the actual EIS service, and so on.

If the service provided by the EIS service provider 102 and the service component client 106 have this mismatch, then the integration server 104, in one embodiment, may front-end the EIS Service Import 302 with an EIS service mapping 406 known as an EIS Service View that maps from the desired interface of the mapped service import 410 to the interface provided by the EIS Service Import 404. An EIS Service View is not a new SCA implementation type, it is a pattern. The apparatus, in one embodiment, can use existing SCA implementation types to implement an EIS Service View, e.g. Java, BPEL, and so on. The concept of service views is not specific to EIS services in one embodiment, and is equally applicable for Web services.

In the following example scenario the desire is to update an SAP order with one method call where in fact multiple calls to the underlying SAPOrder service are necessary to do so. The following example describes an SCA Module named NiceSAPViewModule. The NiceSAPViewModule contains an EIS Service Import 404 for the SAPOrder service, and an EIS service mapping 406 known as an EIS Service View that maps between the NiceSAPOrder interface and the SAPOrder interface.

The following example code shows the EIS Service Import 404 for the SAPOrder service.

```
<scdl:import name="com/sap/services/SAPOrder"
    ...
    xmlns:sap="http:...
    xsi:schemaLocation="http:...Order.xsd
        http:...OrderItem.xsd" >
    <interfaces>
        <interface xsi:type="java:JavaInterface"
    interface="com.sap.services.SAPOrder" />
    </interfaces>
    <binding xsi:type="eis:EISImportBinding">
        <connection
type="com.ibm.j2c.sap.SAPManagedConnectionFactory
interactionType="com.ibm.j2c.sap.SAPInteractionSpec" >
            <serverName>MySAP_A</serverName>
            ...
        </connection>
        <methodBinding method="updOrder">
            <interaction>
                <functionName>UpdOrder</functionName>
            </interaction>
            <inDataBinding xsd="sap:tOrder" />
            <outDataBinding xsd="sap:tOrder" />
        </methodBinding>
        <methodBinding method="crtItem">
            <interaction>
                <functionName>CrtItem</functionName>
            </interaction>
            <inDataBinding xsd="sap:tOrderItem" />
            <outDataBinding xsd="sap:tOrderItem" />
        </methodBinding>
        ...
    </binding>
</scdl:import>
```

The following example code shows the Java interface of the EIS Service Import for the SAPOrder service.

```
public interface SAPOrder {
    public Order updOrder(Order order);
    public OrderItem crtItem(OrderItem orderItem);
    ...
}
```

The following example code shows the SCA definition for the EIS service mapping 406 known as an EIS Service View named NiceSAPOrderView. It has the NiceSAPOrder interface, and a reference named sapOrder to a SCA implementing the SAPOrder interface. The reference is wired to the EIS Service Import 404 for SAPOrder that was defined before.

```
<scdl:component name="integration/sap/services/NiceSAPOrderView"
    xmlns:xsi="http:...XMLSchema-instance"
    xmlns:java="http://..."
    xmlns:scdl="http://...">
    <interfaces>
        <interface xsi:type="java:JavaInterface"
            interface="integration.sap.services.NiceSAPOrder" />
    </interfaces>
    <reference name="sapOrder" target=" com/sap/services/SAPOrder">
        <interface
xsi:type="java:JavaInterface" interface="com.sap.services.SAPOrder"
/>
    </reference>
    <implementation    xsi:type="java:JavaImplementation"
        javaClass="integration.sap.services.NiceSAPOrderViewImpl"
/>
</scdl:component>
```

The following example code shows the Java interface of the NiceSAPOrderView.

```
public interface NiceSAPOrder {
    public NiceOrder updateOrder(NiceOrder niceOrder);
    ...
}
```

The following shows a Java implementation of the EIS service mapping 406 called NiceSAPOrderView. NiceSAPOrderView first locates the actual SAPOrder service via the sapOrder reference. NiceSAPOrderView then maps the NiceOrder input to an Order and updates the order using the actual SAPOrder service. Next NiceSAPOrderView maps all the NiceOrderItems to OrderItems and creates them using the actual SAPOrder service.

```
public class NiceSAPOrderViewImpl implements NiceSAPOrder {
    public NiceOrder updateOrder(NiceOrder niceOrder) {
        ...
        ServiceManager serviceManager = new
            ServiceManager( );
        SAPOrder sapOrder =
(CustomerInfo)serviceManager.locateService("SapOrder");
        // map NiceOrder to Order
            Order order = new Order( );
            order.set<...>(niceOrder.get<...>( ));
        // update Order
            order = sapOrder.updOrder(order);
        // create OrderItems
            Iterator niceOrderItems =
```

-continued

```
niceOrderItems.getItems( ).iterator( );
            while (niceOrderItems.hasNext( )) {
                // map NiceOrderItem to OrderItem
                OrderItem orderItem = new OrderItem( );
                orderItem.set<...>(niceOrderItem.get<...>);
                // create OrderItem
                orderItem = sapOrder.crtItem(orderItem);
                ...}
        ...
        return result;}
    ...
}
```

Now that NiceSAPOrder is available via the NiceSAPOrderView other SCAs that make use of it may be created. The NiceSAPOrderView may also be exported from the SCA module to make it available for service component clients 106 outside of the SCA module.

An EIS Module is a normal SCA module that follows a specific pattern. The pattern contains one or more EIS Service Imports 404, contains zero or more EIS service mappings 406 known as EIS Service Views that are wired to the EIS Service Imports 404, and mapped service exports 408 for EIS Service Views or EIS Service Imports.

The following example code shows an example of an SCA mapped service export 408 definition for the NiceSAPOrderView created in the example above.

```
<scdl:export name=" integration/sap/services/NiceSAPOrder"
    component=" integration/sap/services/NiceSAPOrderView"
    xmlns:xsi="http://www.w3.org/2001/XMLSchema-instance"
    xmlns:java="http://..."
    xmlns:scdl="http://..." >
    <interfaces>
        <interface xsi:type="java:JavaInterface"
            interface="integration.sap.services.NiceSAPOrder" />
    </interfaces>
</scdl:export>
```

Once this declarative export definition is made the EIS Module may be deployed into the ESB, and by that make the NiceSAPOrder service available to other participants on the bus.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A memory device storing executable code executed by a processor to perform operation to access enterprise information system (EIS) resources in a service component architecture (SCA) for an integration server, the operations of the computer program product comprising:
    enabling communication, through a service interface bus (SIBus) architecture comprising mapped service imports and mapped service exports, between an EIS service provider supplying at least one loosely coupled and platform-independent resource and a service component client, accessing the at least one loosely coupled and platform-independent resource provided by the EIS service provider;

generating a first mapped service export matching pattern requirements of a first mapped service import of the service component client;

selectively binding the first mapped, service import to a low-level EIS resource adapter (RA) resource of the EIS service provider through the first mapped service export and an EIS service mapping in response to a first declarative binding definition, each declarative binding definition comprising non-complied human readable code processed by an interpreter and written in service component definition language (SCDL) and that connects with both resources and services, the first declarative binding definition comprising the commands:

```
<scdl:import name="resources/cics/MyCICS_A"...>
    <interfaces>
        <interface xsi:type="java:JavaInterface"
    interface="javax.resource.cci.Interaction" />
    </interfaces>
    <binding xsi:type="eis:EISImportBinding">
        <connection
    type="com.ibm.j2c.cics.ECIManagedConnectionFactory>
            <serverName>MyCICS_A</serverName>
        </connection>
    </binding>
</scdl:import>
``` selectively binding the first mapped, service import to an EIS service of the EIS service provider through the first mapped service export and the EIS service mapping in response to a second declarative binding definition; and selectively binding first mapping service import to one or more EIS resources through the mapped service export and the, EIS service mapping, wherein the EIS service mapping locates the low-level EIS RA resource, recorders data of the low-level EIS RA resource, and generates a new service using the reordered data.

2. A system for accessing enterprise information systems (EIS) resources in a service component architecture (SCA) for an integration server comprising:

a memory storing executable code;

a processor executing the code, the executable code comprising an EIS service provider, supplying at least one loosely coupled and platform-independent resource;

a service component client accessing the at least one loosely coupled and platform-independent resource provided by the EIS service provider;

a service interface bus (SIBus) architecture, enabling communication between the EIS service provider and the service component client;

a process server implementing the SIBus architecture; and a service binder;

generating a first mapped service export matching pattern requirements of a first mapped service import of the service component client;

selectively binding the first mapped service import to a low-level EIS resource adapter (RA) resource of the EIS service provider through the first mapped service export and an EIS service mapping in response to first a declarative binding definition, each declarative binding definition comprising non-complied human readable code processed by an interpreter and written in service component definition language (SCDL) and that connects with both resources and services, the first declarative binding definition comprising the commands;

```
<scdl:import name="resources/cics/MyCICS_A"...>
    <interfaces>
        <interface xsi:type="java:JavaInterface"
    interface="javax.resource.cci.Interaction" />
    </interfaces>
    <binding xsi:type="eis:EISImportBinding">
        <connection
    type="com.ibm.j2c.cics.ECIManagedConnectionFactory>
            <serverName>MyCICS_A</serverName>
        </connection>
    </binding>
</scdl:import>
``` selectively binding the first mapped, service import to an EIS service of the EIS service provider through the first mapped service export and the EIS service mapping in response to a second declarative binding definition; and selectively binding the first mapped, service import to one or more EIS resources through the first mapped service export and the EIS service mapping, wherein the EIS service mapping locates the low-level EIS RA resource, reorders data of the low-level EIS RA resource, and generates a new service using the reordered data.

3. The system of claim 2, wherein the EIS service mapping comprises a plurality of EIS services.

* * * * *